United States Patent
Meriheinä et al.

(10) Patent No.: US 9,372,549 B2
(45) Date of Patent: Jun. 21, 2016

(54) POINTING METHOD, A DEVICE AND SYSTEM FOR THE SAME

(75) Inventors: Ulf Meriheinä, Söderkulla (FI); Ossi Kauppinen, Vantaa (FI); Pekka Kostiainen, Helsinki (FI); Sten Stockmann, Espoo (FI); Anssi Blomqvist, Helsinki (FI)

(73) Assignee: MURATA ELECTRONICS OY, Vantaa (FI)

( * ) Notice: Subject to any disclaimer, the term of this patent is extended or adjusted under 35 U.S.C. 154(b) by 161 days.

(21) Appl. No.: 13/414,068

(22) Filed: Mar. 7, 2012

(65) Prior Publication Data

US 2012/0235905 A1  Sep. 20, 2012

(30) Foreign Application Priority Data

Mar. 14, 2011  (FI) .................................... 20115250

(51) Int. Cl.
*G06F 3/0346* (2013.01)
(52) U.S. Cl.
CPC .................................... *G06F 3/0346* (2013.01)
(58) Field of Classification Search
CPC ... G06K 9/222; G06F 3/03545; G06F 3/0346; G06F 3/0304; G06F 3/038; G06F 3/0338; G06F 3/04892; G06F 3/03543; G06F 3/04847; G06F 3/03541; G06F 3/03542; G06F 3/033; G06F 3/0334; G06F 1/1694
USPC ......... 345/158, 160, 145, 157, 159, 161, 163, 345/164
See application file for complete search history.

(56) References Cited

U.S. PATENT DOCUMENTS

| 5,764,219 A | 6/1998 | Rutledge et al. |
| 5,825,350 A | 10/1998 | Case, Jr. et al. |
| 5,898,421 A | 4/1999 | Quinn |
| 7,158,118 B2 | 1/2007 | Liberty |
| 2003/0094914 A1* | 5/2003 | Yanagita et al. .............. 318/560 |
| 2005/0174324 A1* | 8/2005 | Liberty et al. ................ 345/156 |

(Continued)

FOREIGN PATENT DOCUMENTS

| CN | 101339471 A | 1/2009 |
| CN | 101233390 A | 12/2009 |

(Continued)

OTHER PUBLICATIONS

Finnish Search Report corresponding to Finnish Patent Application No. 20115250 dated Jan. 13, 2012.

(Continued)

*Primary Examiner* — Aneeta Yodichkas
(74) *Attorney, Agent, or Firm* — Squire Patton Boggs (US) LLP

(57) ABSTRACT

The invention shows a method to control a pointing device with an angular, rate sensor, that comprises generating an ensemble of orthogonal unit vector associated signals by at least one angular rate sensor to represent angular rates in a dimensional space for each mutually orthogonal unit vector direction of said dimensional space, amplifying the at least one of said signal non-linearly for determination of cursor on a screen for (x,y) coordinates of the screen, applying a decision criterion to determine the state of the pointing device as based on said unit vector associated signals. The invention also shows a pointer utilizing the method and a system comprising such a pointer.

24 Claims, 3 Drawing Sheets

(56) References Cited

U.S. PATENT DOCUMENTS

| | | | |
|---|---|---|---|
| 2005/0212751 A1* | 9/2005 | Marvit et al. | 345/156 |
| 2005/0264525 A1* | 12/2005 | Adams | G03F 3/03545 345/156 |
| 2006/0007115 A1* | 1/2006 | Furuhashi et al. | 345/156 |
| 2009/0009471 A1* | 1/2009 | Yamamoto et al. | 345/158 |
| 2009/0128489 A1 | 5/2009 | Liberty et al. | |
| 2009/0267898 A1* | 10/2009 | Yamamoto et al. | 345/158 |
| 2009/0322679 A1* | 12/2009 | Sato et al. | 345/158 |
| 2010/0100359 A1 | 4/2010 | Podoloff et al. | |
| 2010/0156788 A1* | 6/2010 | Nakaoka | G06F 3/0383 345/158 |
| 2010/0218024 A1 | 8/2010 | Yamamoto et al. | |
| 2010/0315339 A1 | 12/2010 | Yamamoto | |

FOREIGN PATENT DOCUMENTS

| | | |
|---|---|---|
| EP | 2199888 A2 | 6/2010 |
| JP | 10-253361 A | 9/1998 |
| JP | 2000-148379 A | 5/2000 |
| JP | 2001-337783 A | 12/2001 |
| JP | 2007-509448 A | 4/2007 |
| JP | 2007-531113 A | 11/2007 |
| JP | 2008-542782 A | 11/2008 |
| JP | 2009-015600 A | 1/2009 |
| JP | 2010-146231 A | 7/2010 |
| JP | 2010-164571 A | 7/2010 |
| TW | 201009653 A1 | 3/2010 |
| WO | WO 02/21253 A1 | 3/2002 |
| WO | WO 2007/015137 A1 | 2/2007 |
| WO | 2009/069531 A1 | 6/2009 |

OTHER PUBLICATIONS

International Search Report for PCT Application No. PCT/FI2012/050200, Mailed Jul. 4, 2012.

Search Report dated Nov. 12, 2015, issued in corresponding Taiwan Patent Application No. 101108259.

Office Action dated Oct. 24, 2015, issued in corresponding CN Application No. 2012800128907.

Office Action mailed Mar. 1, 2016, issued in corresponding Japanese Application No. 55847912013 (English translation only).

Search Report dated Mar. 15, 2016, issued in corresponding Chinese application No. 2012800128907.

* cited by examiner

POINTING METHOD, A DEVICE AND SYSTEM FOR THE SAME

In very general level the invention is related to information technology, therein in the field of pointing. More specifically the invention relates to a method of controlling pointing a device according to the preamble of an independent claim directed thereto. The invention relates also to a pointer according to the preamble of an independent claim directed thereto. The invention relates also to a pointing system according to an independent claim directed thereto.

When preparing, making and/or giving a presentation, a common problem in controlling a cursor on a screen, by using an angular rate sensor is how to handle the angular rate offset of the sensor and make the motion of the cursor smooth and comfortable and/or to make the usage easy and efficient for the user. This problematic as such is described in many publications, e.g. U.S. Pat. Nos. 5,825,350 and 5,898,421. Cursor stability is affected by white and 1/f noise as well as zero drift in the angular rate sensor.

A state of the art patent document U.S. Pat. No. 5,825,350 (Gyration) discloses a pointer solution as shown therein that is based on sampled output from gyro. In the solution a $1^{st}$ threshold is used for motion (below =unintentional movement) detection, and $2^{nd}$ threshold for motion (between thresholds=partly unintentional movement). The solution also uses in removing effects of gyro a bias offset by determining the bias offset from sampled gyro output and previous outputs.

A state of the art patent document U.S. Pat. No. 5,898,421 (Gyration) discloses a vertical gyroscope for controlling the position of a cursor on the display and a method for moving an object in response to pitch and/or yaw rotations.

A further state of the art patent document U.S. Pat. No. 7,158,118 (Hillcrest) discloses a 3d pointing device, which removes the effects associated with tilt of the 3d pointing device and a system for more 3 degrees of freedom.

However, the state of the art solutions have made improvement for the problems mentioned or referred via the reference publications, but they do not show non-linear amplification of the angular rate signal nor on detection of stationary state based on $w^2$ for making the control smooth.

Embodiments of the invention provide a smooth control of the cursor. The inventors have noticed that the smoothness is facilitated by using a non-linear transfer function, which gives both position accuracy and fast transition from one location to another.

A method to control a pointing device with an angular rate sensor according to the invention is characterized in that what has been said in the characterizing part of the independent method claim thereof. A pointer according to the invention is characterized in that what has been said in the characterizing part of the independent pointer claim thereof. A pointer system according to the invention is characterized in that what has been said in the characterizing part of the independent method claim thereof. Other embodiments are shown in the dependent claims and examples. Embodiments of the invention are combinable in suitable part. The term comprise has used as an open expression.

According to an embodiment of the invention the method to control a pointing device with an angular rate sensor, comprises generating an ensemble of orthogonal unit vector associated signals by at least one angular rate sensor to represent angular rates in a dimensional space for each mutually orthogonal unit vector direction of said dimensional space, amplifying the at least one of said signal non-linearly for determination of cursor on a screen for (x,y) coordinates of the screen, applying a decision criterion to determine the state of the pointing device as based on said unit vector associated signals.

According to an embodiment of the invention in the method said decision criterion comprises:

determining the integral of the amplified angular rate signal for determination of the position of the cursor on said screen, determining the stationary state of the pointing device, as defined by the function of equation (1) relative to a preset threshold, updating the zero point offset of the angular rate sensor, when it is stationary $\omega_0(z,y)=\omega(z=0,y=0)$ or $\omega_0(z,y,x)=\omega(z=0,y=0,x=0)$.

According to an embodiment of the invention in the method the angular rate sensor comprises at least one 2- or 3-axis angular rate sensor to correspond said dimensional space.

According to an embodiment of the invention in the method the amplification factor of the angular rate signal is defined at least partly by equation (1), equation (2) and/or equation (3).

According to an embodiment of the invention the method the amplifications in z- and y-directions are the same.

According to an embodiment of the invention in the method at least one of the unit vector direction associated signal is formed by using a slice-wise linear function.

According to an embodiment of the invention in the method the slice-wise slicing comprises at least 3 slices there between the zero value and the maximum value of said angular rate sensor used for generating said angular rate signal.

According to an embodiment of the invention in the method said slicing is adaptive in at least one direction of unit vector.

According to an embodiment of the invention in the method the function $\omega$ is defined by a conic section curve.

According to an embodiment of the invention in the method the function used is defined by the z and y components as $\omega^2=\omega(z)\cdot\omega^2(z)+\omega(y)\cdot\omega^2(y)$ as applied for z- and y-axis respectively According to an embodiment of the invention in the method the zero point correction of the angular rate sensor is based on an average of the output angular rate values of a stationary angular rate sensor.

According to an embodiment of the invention in the method the offset values $\omega_0(z, y)$ are averages $\omega_{0ave}(z, y)$ recursively updated as $\omega_{0ave}(z, y)=\omega_{0ave}ave(z, y)*(n-1)/n+\omega_0(z, y)/n$, where n is the effective number of samples for averaging.

According to an embodiment of the invention in the method the zero point offset correction is made as an update that is based on a digitally low pass filtered angular rate output value of a stationary angular rate sensor.

According to an embodiment of the invention in the method the filter function used comprises $\omega_0\text{filt}(n)=\omega_0\text{filt}(n-1)*(1-1/k)+\omega_0/k$, where $\omega_0\text{filt}(n)$ is the new filtered value, $\omega_0\text{filt}(n-1)$ the old filtered value and k a filter constant, respectively.

According to an embodiment of the invention the method further comprises detecting at the beginning a stationary state, detecting the opportunity to make initial angular rate zero offset cancelling comparing the variances of the angular rate function around axes z and y to preset threshold values, according to the criterion var($\omega$(z))<var($\omega$(z)) and/or var($\omega$(y))<var(th(y)) respectively.

According to an embodiment of the invention the method further comprises the detecting of a stationary state as an option as the combination of comparing the function $\omega^2$ and variances var($\omega$(z)) and var($\omega$(y)) to respective preset thresholds.

According to an embodiment of the invention the method comprises keeping the angular rate sensor in stand-by state while not on duty, detecting according to a preset criterion the need for wake up, waking up for taking two or more angular rate readings for diagnostics and to give a proper estimate for the angular rate.

According to an embodiment of the invention pointer comprises an angular rate sensor configured to operate in said pointer according to a method according to an embodiment of the invention.

According to an embodiment of the invention the pointer further comprises at least one of the following:

a memory for saving certain positions and/or the configuration associated to said position, marker to save a certain position and/or the related configuration, wireless means to communicate the position data to a presentation system and recalling means to restore certain position and/or the related configuration.

According to an embodiment of the invention the pointer is adapted for use with such a screen that comprises a display.

According to an embodiment of the invention the pointer according to an embodiment further comprises a laser beam generating means for producing a light spot to be directed on a side screen.

According to an embodiment of the invention pointer system comprises a pointer according to an embodiment of the invention as adapted to be operable with a presentation system, comprising at least one of the following; a computer, software executable in said computer for the presentation system, screen and display.

In the following embodiments of the invention are explained in a further detail with the examples by reference to the figures as follows:

FIG. 1. Illustrates an arbitrary pointer in use,

Figure 1:
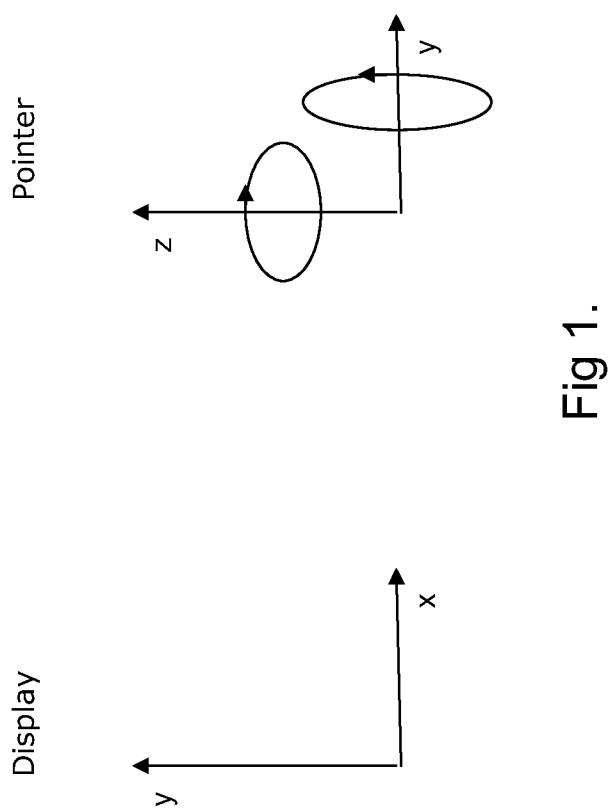

According to an embodiment the amplification function for non-linearity is determined by the amplitude of the angular rate projection in the plane of the display. In this way the amplification in x- and y-axis on the display is the same and e.g. the distortion of a circle can be avoided. As good function, for example, from e.g. calculation, complexity and power consumption point of view, for determining the amplification is shown in equation (1)

$$\omega^2 = \omega^2(z) + \omega^2(y) \tag{1}$$

where $\omega$(z) and $\omega$(y) are angular rates around z- and y-axis respectively (also referred as yaw and pitch). According to an embodiment the gain could be set directly to be proportional to $\omega^2$, resulting in effectively a $3^{rd}$ order relationship. According to another optional embodiment there could be an ensemble of selected thresholds and when $\omega^2$ crosses one of them the next gain value will be used. The integral of the resulting angular rate is then used as a position as such and/or through a trigonometric function.

The function of equation (1) can also be used to determine, whether the pointer is moving or not. Hereby according to an embodiment of the invention it is compared with a pre-determined or adaptive threshold. In an embodiment, if $\omega^2$ is below the threshold the pointer is considered stationary and the cursor is being kept in its position and gyro zero point offsets $\omega_{0z}$ and $\omega_{0y}$ can be updated. In an embodiment of the invention the offset update is done as based on the recent zero point average. According to an embodiment the average could be updated using the recursive formula (2)

$$\omega_{0ave}(z,y) = \omega_{0ave}(z,y)\frac{n-1}{n} + \omega_0(z,y)\frac{1}{n}, \tag{2}$$

where n=the effective number of samples for averaging. These offsets (z, y) are then subtracted from the angular rate sensor output signals to get effective angular rates $\omega$(z) and $\omega$(y) respectively.

According to an embodiment a member in the recursion of the average is calculated as an arithmetic average. According to an embodiment a member in the recursion of the average is calculated as a geometric average. According to an embodiment a member in the recursion of the average is calculated as a harmonic average. According to an embodiment of the invention at least one member in the recursion is weighted.

Initial offset correction after switching on the device is another challenge known as such from the known techniques. Hereby one has to be sure that the device is not moving. According to an embodiment, this can be checked by comparing angular rate variances (denoted by var(f), in which the f is the variable object from which the var is taken) var($\omega$)(z)) and var($\omega$(y)) with selected thresholds (abbreviated also as th) var(th(z)) and var(th(y)) respectively. According to an embodiment of the invention the thresholds could be the same for both axes, but is not limited only there to, or the number of said axes. According to an embodiment of the invention the thresholds may be different for taking into account if not totally eliminating at least mitigating the tilt of the screen.

Variances can also be used as a criterion for a stationary device at a later stage as such or in combination with $\omega^2$. According to an optional embodiment of the invention, the variances are calculated from digitally filtered angular rate values to minimize the effect of other than human motion. For such an embodiment to be used, the digital low-pas filter could be of the form of equation (3)

$$y(n) = y(n-1) \cdot \left(1 - \frac{1}{k}\right) + x(n)\frac{1}{k}, \tag{3}$$

where x(n) is the $n^{th}$ raw angular rate sample, y(n) the $n^{th}$ filtered sample and k the filter constant, respectively.

According to an embodiment of the invention the coordinates z,y are shown for equations (1), (2) and (3) as examples only, from which a skilled man in the art can derive the similar equation to any relevant pair of the Cartesian coordinates (x,y,z). A skilled man in the art recognizes the Cartesian coordinate system as one notion to be used for showing embodiments of the invention. However, utilisation of Cartesian coordinates are used for the illustrative purposes, but the mere notion as such can be made and shown also in other coordinate systems as well without leaving the scope of the embodiments.

Parameters for detection of a stationary state and sensor gain function and its non-linearity can of course be tuned to best suite the user and the application.

In accordance of an embodiment, using a 3-axis angular rate sensor gives the flexibility to have the sensor in the pointer in any position relative to the display with the cursor. In addition it enables roll compensation to minimize display x,y-axis turning as a function of pointer roll around its x-axis.

The normally relatively high current consumption of the angular rate sensor is often a limiting factor in battery operated devices. According to an embodiment of the invention, by using the stand-by mode of the angular rate sensor and switching it on just for taking short readings one can reduce average current consumption approximately by 50%. According to an embodiment of the invention the wake can be detected from sudden movement of the pointer, to make sure, that the angular rate sensor is properly woken up and that the readings that are taken is stable and reproducible. For the purpose one can take one or more additional readings for diagnostics and prediction of the right angular rate value.

According to an embodiment of the invention the equations (1) to (3) show and relate to quadratic type of function for the signal amplification function. However, according to an embodiment of the invention the amplification function f (equation 4) can be an exponential function, if very fast movement is embodied. Although also logarithm function can be used as such, but the operation is different and may be difficult to handle as the movement may be slowed down in a certain part of the screen for the corresponding translation of the cursor on the screen.

Also other power-functions such as cubic can be also used according to the equation (4)

$$\text{output}=f(\text{input}) \quad (4)$$

For the relation between the generated signal as input and the amplified signal as output.

If non-bijective functions are use for the function f, it is preferred to use such functions f only for corresponding embodiments that in such parts that constitute a bijective nature in the slice of the input range to be used for the corresponding operation.

This provides an advantage to have smooth but also sensitive pointing with small angular rates but simultaneously a fast movement, in which the fast means faster than if a linear amplification were used. In the logarithmic embodiment case the amplification can be slower to one direction for a distance, but faster to another distance.

According to an embodiment of the invention the pointer that is configured to operate according to the method embodied comprises also a selection tool so that the amplification function can be chosen. This way the diversity of the pointer can be increased and the personal use is facilitated. In such an embodiment it is advantageous to have memory and/or micro processor so that the method can be operated and the necessary calculations made. The memory can be used also for saving certain user specific configurations that were found advantageous for a user with a certain screen. The memory can be used also for calibrating and/or synchronizing displaying areas of two screens, one at the desktop or laptop, and another on a screen that does not illuminate own light, such as for example a big screen. The settings and/or the signal can be communicated to a presentation system server of the pointer system that either makes the amplification in a diversified embodiment, or receives the already amplified signal in an integrated embodiment. According to an embodiment of the invention using the diversified embodiment the pointer may be saving some electricity more than in the integrated embodiment and thus the battery life may be longer for the pointer.

According to an embodiment also different amplification functions can be used as the slice specific functions of the input quantity range. Also the average calculation can be made in a slice specific way. This way can be obtained improved accuracy, especially if the screen is not a flat planar screen or when it is tilted from the vertical or essentially vertical position.

EXAMPLES

Figure 2:
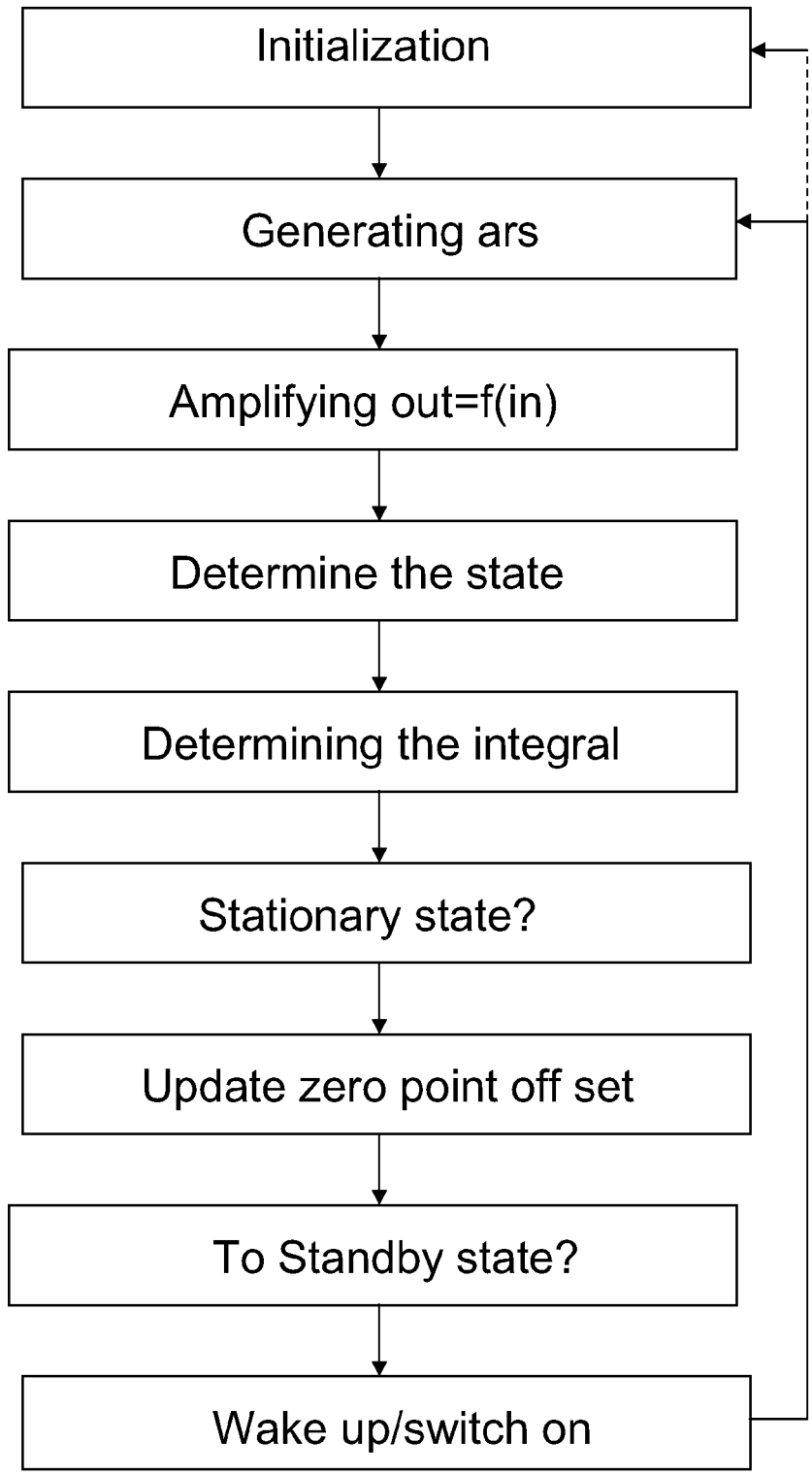
FIG. 2 illustrates embodiments of the invention.

FIG. 2 illustrate an example embodiment of the invention. The FIG. 2 shows several embodiments of the method to control a pointing device with an angular rate sensor (ars). All the phases are not necessarily comprised and/or in the same order. Some method phases may be parallel and/or at least partly parallel. The example in FIG. 2 comprises an initialization phase. This is made when the pointer of FIG. 2 is switched on, but according to an embodiment variant also when the pointer is waking up. According to an embodiment the user may want to reset the pointer with the related means in the embodiment. Also user specific configurations can be recalled from the memory in such embodiments (see FIG. 3) that are so configured and/or comprise the memory. In the method there is a sensor bank, of which at least one sensor is arranged to generate an ensemble of orthogonal unit vector associated signals by at least one angular rate sensor to represent angular rates in a dimensional space for each mutually orthogonal unit vector direction of said dimensional space.

In the method at least one of said signal non-linearly for determination of cursor on a screen for (x,y) coordinates of the screen is amplified according to the amplifying function. At this phase also filtering, averaging or applying other statistical functionalities to the signal can be made. The state of the pointer is determined, which is made by applying a decision criterion to determine the state of the pointing device as based on said unit vector associated signals. The amplification function thus can comprise features from the equations (1) to (4), individually or in combination. According to a variant the function ω is defined by a conic section curve or a slice of such. The functions can be used so that the input quantity range is divided to slices. According to a variant at least one slice can apply a different function than another slice. These slice specific functions can be also linear functions. The linear functions can be arranged to approximate a curve of a higher degree or exponential, or a combination thereof for a bijective response amplification function for the amplification. According to an embodiment at least 3 slices there between the zero value and the maximum value of said angular rate sensor used for generating said angular rate signal. According to an embodiment not necessarily the all slices, but some or at least one in the embodiment, can be such that the slicing is made further to sub slices, even in an adaptive manner to approximate a certain function in the slice range of input. Thus at least one of the unit vector direction associated signal is formed by using a slice-wise linear function.

According to an example of the embodiment of the invention the decision criterion comprises determining the integral of the amplified angular rate signal for determination of the position of the cursor on said screen, determining the stationary state of the pointing device, as defined by the function of equation (1) relative to a preset threshold, and consequently updating the zero point offset of the angular rate sensor, when it is stationary so that $\omega_0(z, y)=\omega(z=0, y=0)$ or
$\omega_0(z, y, x)=\omega(z=0, y=0, x=0)$.

The update of zero point off set can be checked in an embodiment of the method. The zero point correction of the angular rate sensor can be based on an average of the output angular rate values of a stationary angular rate sensor. The offset values $\omega_0(z, y)$ are averages (ave) $\omega_{0ave}(z, y)$ recursively updated as $\omega_{0ave}(z, y)=\omega_{0ave}$ ave$(z, y)*(n-1)/n + \omega_{0ave}(z, y)/n$, where n is the effective number of samples for averaging. In an embodiment variant the zero point offset correction is made as update based on a digitally low pass filtered angular rate output value of a stationary angular rate sensor. In an embodiment the filter function used comprises $\omega_0\text{filt}(n)=\omega_0\text{filt}(n-1)*(1-1/k)+\omega_0/k$, where $\omega_0\text{filt}(n)$ is the new filtered value, $\omega_0\text{filt}(n-1)$ the old filtered value and k a filter constant, respectively.

According to an embodiment the method comprises also detecting at the beginning a stationary state, detecting the opportunity to make initial angular rate zero offset cancelling and/or comparing the variances of the angular rate function around axes z and y to preset threshold values, according to an exemplary criterion as follows var($\omega(y)$)<var(th(z)) and/or var($\omega(y)$)<var(th(y)) respectively.

In an embodiment of the invention detecting of a stationary state as a standby state as the combination of comparing the function $\omega^2$ and variances var($\omega(z)$) and var($\omega(y)$) to respective preset thresholds. According to an embodiment of the invention the stationary state is a broader state, in which the pointer is ready to be used. The state is not in movement as such in respect to the local coordinate system, but in this state the power is on and the device is just waiting to be used. In a standby state followed from the stationary state the pointer hibernates to a deeper state of preserving energy so that it can be waked up by moving the pointer. According to an embodiment of the invention the pointer is comprises a timer, so that the standby state can be followed by switch off state. This is demonstrated in FIG. 2 by the arrow from the wake up/switch on indicative box to the top most two upper boxes so that if the pointer was switched off the initialization phase is made and the settings configured and/or changed according to the user.

According to an embodiment of the invention the pointing device, pointer, comprises a 2- or 3-axis angular rate sensor, wherein the method comprises keeping the angular rate sensor in stand-by state while not on duty, detecting according to a preset criterion the need for wake up, waking up for taking two or more angular rate readings for diagnostics and to give a proper estimate for the angular rate.

Figure 3:
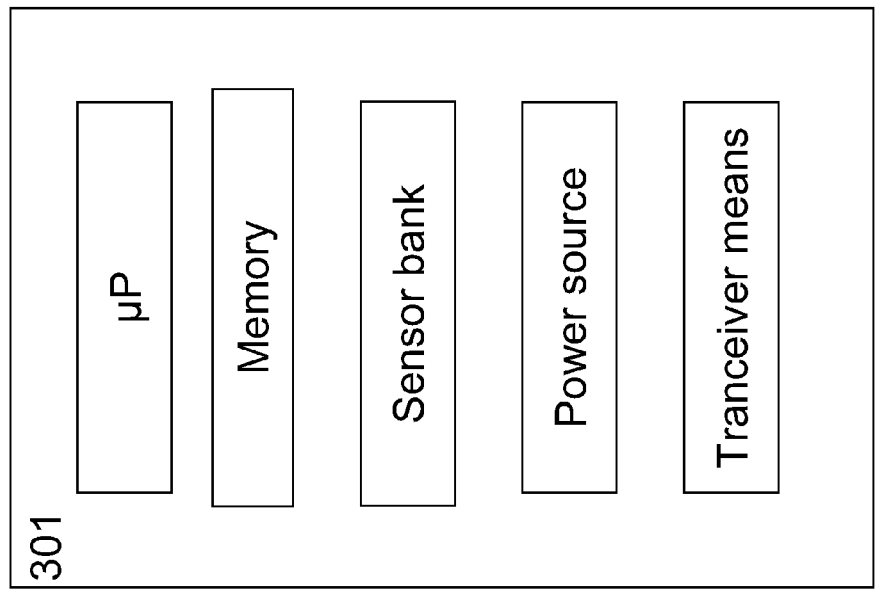
FIG. 3 illustrates a pointer according to an embodiment of the invention.

FIG. 3 shows examples on the pointing device 301 that is operable according to method embodiments. According to an embodiment the sensor bank comprises at least at least one 2- or 3-axis angular rate sensor to correspond said dimensional space. The sensor bank can comprise other sensors as well in an embodiment variant. For the functionalities of the pointer, it comprises at least one of the following: a memory for saving certain positions and/or the configuration associated to said position, marker to save a certain position and/or the related configuration, wireless means to communicate the position data to a presentation system and recalling means to restore certain position and/or the related configuration. The transceiver means are arranged in an embodiment for communicating the signal in accordance of the integral or diversified embodiment between the pointer and the presentation system server. According to an embodiment the transceiver means as such can be embodied according to known techniques as such.

According to an embodiment the pointer is adapted for use with a screen that comprises a display. According to an embodiment variant the pointer comprises also a laser beam generating means for producing a light spot on a side screen. This can be advantageous when the presentation giving person is about to work with a display screen but the audience is following the presentation at a big screen. According to an embodiment of the invention there is also means that can be used to disassemble the synchronization. According to an embodiment of the invention the pointer itself can comprise a small display for guiding the user for the pointer operations. This can be embodied in several ways, however adapted to the hand-held pointer as an embodiment. According to an optional embodiment the pointer system communicates with the pointer and the display so that there guiding function can be made on a screen to be used for the presentation.

Figure 4:
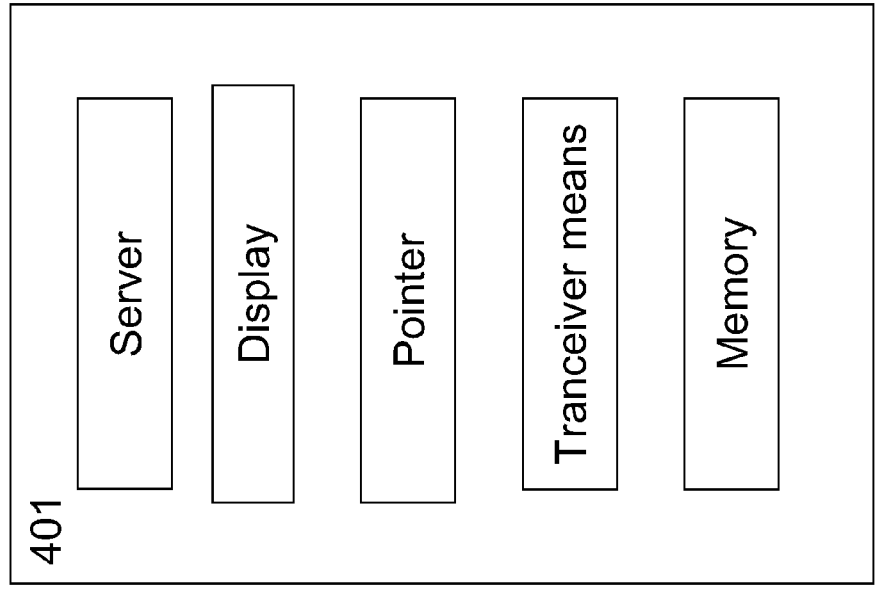
FIG. 4 illustrates a pointer system according to an embodiment of the invention.

According to an embodiment of the invention the FIG. 4 shows an example of a pointer system 401. The system comprises a pointer according to an embodiment of the invention as adapted to be operable with a presentation system, comprising at least one of the following: a computer, software executable in said computer for the presentation system, screen and display. Transceiver means can be used for the communication with the pointer, for example. According to an embodiment the pointer system can comprise a server program that can comprise in suitable part the programmatic means and/or interfaces to make the presentation system to be operable with the pointer 301, and/or the transceiver means with the screen to be used. The pointer system can comprise also a memory for the operations for the pointer system. According to an embodiment of the invention the program code for constituting the pointer system according to an embodiment, in a computer, or a part of the system, entirely or partly as an initial assembly or for an update, comprises the driver means for the communications and/or means for the method. According to an embodiment the pointer settings and/or the firmware in it is arranged to be updateable via the communication of the transceiver means.

The invention claimed is:

1. A method to control a pointing device with an angular rate sensor (ars), said method comprising:
  generating an ensemble of orthogonal unit vector associated angular rate signals by at least one angular rate sensor, each angular rate signal representing an angular rate in a dimensional space for a mutually orthogonal unit vector direction of said dimensional space;
  amplifying at least one of said angular rate signals with an amplification function that is a non-linear function of at least one of said angular rate signals;
  determining (x,y) coordinates of a cursor on a screen from said angular rate signals, one of said (x,y) coordinates corresponding to one of said angular rate signals;
  applying a decision criterion to determine a stationary state of the pointing device from said unit vector associated angular rate signals, and
  updating, in response to determining the stationary state of the pointing device, a zero point offset of the angular rate sensor.

2. The method according to claim 1, wherein said decision criterion comprises:
  determining the integral of the amplified angular rate signal for determination of the position of the cursor on said screen, determining the stationary state of the pointing device, as defined by the function of $\omega^2=\omega^2(z)+\omega^2(y)$ relative to a preset threshold, where $\omega(z)$ and $\omega(y)$ are angular rates around z- and y-axis respectively, updating the zero point offset of the angular rate sensor, when it is stationary, so as $\omega_0(z, y)=\omega(z=0, y=0)$ and/or $\omega_0(z, y, x)=\omega(z=0, y=0, x=0)$.

3. The method according to claim 2, wherein the zero point offset has offset values $\omega_0(z, y)$, and averages (ave) $\omega_{0ave}(z, y)$ recursively updated as $\omega_{0ave}(z, y)=\omega_{0ave}(z, y)*(n-1)/n+\omega_0(z, y)/n$, where $\omega$ represents angular rate and n is the effective number of samples for averaging.

4. The method of claim 1, wherein the angular rate sensor comprises at least one 2- or 3-axis angular rate sensor to correspond said dimensional space.

5. The method of claim 1, wherein said amplifying comprises amplifying by an amplification factor of the angular rate signal defined at least partly by at least one of the following equations:

$$\omega^2 = \omega^2(z) + \omega^2(y), \quad (1)$$

$$\omega_{0ave}(z, y) = \omega_{0ave}(z, y)\frac{n-1}{n} + \omega_0(z, y)\frac{1}{n}, \text{ or} \quad (2)$$

$$y(n) = y(n-1) \cdot \left(1 - \frac{1}{k}\right) + x(n)\frac{1}{k}, \quad (3)$$

wherein $\omega(z)$ and $\omega(y)$ are angular rates around z- and y-axis, respectively, wherein $\omega_{0ave}$ is the zero point average and $\omega_0$ is the zero point offset, wherein n is the effective number of samples for averaging, and wherein $x(n)$ is the $n^{th}$ raw angular rate sample, $y(n)$ the $n^{th}$ filtered sample and k the filter constant, respectively.

6. The method of claim 5, wherein the amplifications in z- and y-directions are the same.

7. The method of claim 5, wherein at least one of the unit vector direction associated angular rate signal is formed by using a slice-wise linear function.

8. The method of claim 7, wherein the slice-wise slicing comprises at least 3 slices there between the zero value and the maximum value of said angular rate sensor used for generating said angular rate signal.

9. The method of claim 8, wherein said slicing is adaptive in at least one direction of unit vector.

10. The method of claim 5, wherein a function $\omega$ is defined by a conic section curve.

11. The method of claim 5, wherein the function $\omega^2$ is further defined by the z and y components as $\omega^2=\omega(z)\cdot\omega^2(z)+\omega(y)\cdot\omega^2(y)$ as applied for z- and y-axis respectively, where $\omega$ represents angular rate.

12. The method of claim 1, wherein a zero point correction of the angular rate sensor is based on an average of the output angular rate values of a stationary angular rate sensor.

13. The method according to claim 1, wherein a zero point offset correction is made as update based on a digitally low pass filtered angular rate output value of a stationary angular rate sensor.

14. The method according to claim 13, further comprising using a filter function comprising $\omega_0\text{filt}(n)=\omega_0\text{filt}(n-1)*(1-1/k)+\omega_0/k$, where $\omega_0\text{filt}(n)$ is the new filtered value, $\omega_0\text{filt}(n-1)$ the old filtered value and k a filter constant, respectively, and where n is the effective number of samples for averaging.

15. The method according to claim 1, wherein the method comprises detecting at the beginning the stationary state, detecting an opportunity to make initial angular rate zero offset cancelling comparing the variances of the angular rate function around axes z and y to preset threshold values, according to the criterion $\text{var}(\omega(z))<\text{var}(\text{th}(z))$ and/or $\text{var}(\omega(y))<\text{var}(\text{th}(y))$ respectively, where $\omega$ represents angular rate.

16. The method according to claim 1, wherein the method comprises detecting the stationary state as the combination of comparing the function $\omega^2$ and variances $\text{var}(\omega(z))$ and $\text{var}(\omega(y))$ to respective preset thresholds, where $\omega$ represents angular rate.

17. The method according to claim 1 to control a pointing device with a 2- or 3-axis angular rate sensor, wherein the method comprises keeping the angular rate sensor in stand-by state while not on duty, detecting according to a preset criterion the need for wake up, waking up for taking two or more angular rate readings for diagnostics and to give a proper estimate for the angular rate.

18. A pointer system, comprising:

a pointer including an angular rate sensor configured to generate an ensemble of orthogonal unit vector associated angular rate signals, each angular rate signal representing an angular rate in a dimensional space for a mutually orthogonal unit vector direction of said dimensional space;

an amplifier configured to amplify at least one of said angular rate signals with an amplification function that is a non-linear function of at least one of said angular rate signals; and a processor configured to determine (x,y) coordinates of cursor on a screen, one of said (x,y) coordinates corresponding to one of said angular rate signals, wherein the processor is configured to apply a decision criterion to determine a stationary state of the pointer from said unit vector associated angular rate signals, and update, in response to determining the stationary state of the pointing device, a zero point offset of the angular rate sensor.

19. The pointer system of claim 18, wherein the pointer comprises the amplifier and the processor.

20. The pointer system of claim 19, wherein the pointer comprises at least one of the following:

a memory for saving certain positions and/or the configuration associated to said position, a marker to save a certain position and/or the related configuration, wireless means to communicate the position data to a presentation system, and recalling means to restore certain position and/or the related configuration.

21. The pointer system of claim 20, wherein the pointer is configured to be used with a screen that comprises a display.

22. The pointer system of claim 18, comprising a presentation system server that includes the amplifier and the processor.

23. The pointer system according to claim 18, wherein the pointer comprises a laser beam generating means for producing a light spot on a side screen.

24. A pointer comprising:
- an angular rate sensor configured to generate an ensemble of orthogonal unit vector associated angular rate signals, each angular rate signal representing an angular rate in a dimensional space for a mutually orthogonal unit vector direction of said dimensional space;
- an amplifier configured to amplify at least one of said angular rate signals non-linearly; and
- a processor configured to determine (x,y) coordinates of a cursor on a screen from said angular rate signals, the processor being configured to apply a decision criterion to determine a stationary state of the pointer from said unit vector associated angular rate signals, and update, in response to determining the stationary state of the pointing device, a zero point offset of the angular rate sensor.

* * * * *